(12) United States Patent
Göebelt et al.

(10) Patent No.: US 8,871,856 B2
(45) Date of Patent: Oct. 28, 2014

(54) WETTING AGENTS AND DISPERSANTS BASED ON MIXTURES OF STRUCTURE COPOLYMERS

(75) Inventors: Bernd Göebelt, Wesel (DE); Jurgen Omeis, Dorsten-Lembeck (DE); Sabine Johann, Oberhausen (DE); Sandra O'Shea, Gladbeck (DE)

(73) Assignee: BYK-Chemie GmbH (DE)

( * ) Notice: Subject to any disclaimer, the term of this patent is extended or adjusted under 35 U.S.C. 154(b) by 1141 days.

(21) Appl. No.: 12/444,867

(22) PCT Filed: Oct. 9, 2007

(86) PCT No.: PCT/EP2007/008781
§ 371 (c)(1),
(2), (4) Date: Mar. 12, 2010

(87) PCT Pub. No.: WO2008/043529
PCT Pub. Date: Apr. 17, 2008

(65) Prior Publication Data
US 2010/0168316 A1   Jul. 1, 2010

(30) Foreign Application Priority Data
Oct. 10, 2006   (DE) .......................... 10 2006 048 144

(51) Int. Cl.
| C08F 297/00 | (2006.01) |
| C08F 220/34 | (2006.01) |
| C08F 220/28 | (2006.01) |
| C08F 293/00 | (2006.01) |
| C08L 53/00  | (2006.01) |

(52) U.S. Cl.
CPC ............ C08L 53/00 (2013.01); *C08F 2438/03* (2013.01); C08F 293/005 (2013.01); *C08L 2205/02* (2013.01)

USPC ............. 524/505; 524/523; 525/94; 525/294; 525/299; 525/222; 526/320

(58) Field of Classification Search
USPC ............ 524/505, 523; 525/222, 94, 294, 299; 526/320
See application file for complete search history.

(56) References Cited

U.S. PATENT DOCUMENTS

| 6,288,173 | B1 * | 9/2001 | Schimmel et al. ............ 525/294 |
| 6,455,628 | B1   | 9/2002 | Ma et al. |
| 2003/0096929 | A1 * | 5/2003 | Olson et al. .................... 526/243 |
| 2003/0105201 | A1 * | 6/2003 | Auschra et al. ................. 524/415 |
| 2006/0160950 | A1 * | 7/2006 | Auschra et al. ................. 525/89 |
| 2006/0194932 | A1   | 8/2006 | Farcet |

FOREIGN PATENT DOCUMENTS

| EP | 1416019 A1 | 5/2004 |
| JP | 2006-188625 A | 7/2006 |
| WO | WO-03/046029 A1 | 6/2003 |
| WO | WO-2004078785 A1 | 9/2004 |
| WO | WO-2006/002496 A1 | 1/2006 |
| WO | WO 2007/075817 * | 7/2007 |

* cited by examiner

*Primary Examiner* — James J Seidleck
*Assistant Examiner* — Deve E Valdez
(74) *Attorney, Agent, or Firm* — Schwegman Lundberg & Woessner, P.A.

(57) ABSTRACT

The invention relates to compositions comprising two structured linear copolymers selected from the group consisting of block copolymers and gradient copolymers, these copolymers being prepared by different controlled polymerization techniques and the difference in the polydispersities of these copolymers, $\Delta(M_w/M_n)$, being $\geq 0.25$. The invention further relates to the production of such blends and to their use as wetting agents and dispersants.

19 Claims, No Drawings

WETTING AGENTS AND DISPERSANTS BASED ON MIXTURES OF STRUCTURE COPOLYMERS

RELATED APPLICATIONS

This application is a national stage application under 35 U.S.C. §371 of PCT/EP2007/008781, filed Oct. 9, 2007, and published as WO 2008/043529 A2 on Apr. 17, 2008, which claims priority under 35 U.S.C. §119 to German Application No. 10 2006 048 144.5, filed Oct. 10, 2006, which applications and publication are incorporated herein by reference and made a part hereof in their entirety.

The invention relates to the blends of two linear, structured copolymers which are distinguished by the selection of two different polymerization techniques and different molecular weight distributions (polydispersities) $M_w/M_n$ and which are suitable as dispersants, for treating pigments, and as additives to coating materials and moulding compounds. The invention further relates to the use of such blends as wetting agents and dispersants.

Recent years have seen development of a variety of controlled polymerization processes suitable for preparing block copolymers. These processes include, for example, the Reversible Addition Fragmentation Chain Transfer (RAFT) process, which when using certain polymerization regulators is also called MADIX and Addition Fragmentation Chain Transfer. RAFT is described for example in Polym. Int. 2000, 49, 993, Aust. J. Chem. 2005, 58, 379, J. Polym. Sci. Part A: Polym. Chem. 2005, 43, 5347, U.S. Pat. No. 6,291,620, WO 98/01478, WO 98/58974 and WO 99/31144. Another process of controlled polymerization makes use of nitroxyl compounds as polymerization regulators (NMP), and is disclosed for example in Chem. Rev. 2001, 101, 3661. Atom Transfer Radical Polymerization (ATRP) likewise allows controlled polymerization and is described for example in Chem. Rev. 2001, 101, 2921. Examples of other controlled polymerization processes are Group Transfer Polymerization (GTP), as disclosed for example by O. W. Webster in "Group Transfer Polymerization" in "Encyclopedia of Polymer Science and Engineering", Volume 7, H. F. Mark, N. M. Bikales, C. G. Overberger and G. Menges, Eds., Wiley Interscience, New York 1987, page 580 ff.; controlled free-radical polymerization with tetraphenylethane, as described for example in Macromol. symp. 1998, 111, 63; controlled free-radical polymerization with 1,1-diphenylethene as polymerization regulator, as described for example in Macromolecular Rapid Communications, 2001, 22, 700; controlled free-radical polymerization with iniferters, as disclosed for example in Macromol. Chem. Rapid. Commun. 1982, 3, 127; and controlled free-radical polymerization with organocobalt complexes, as known for example from J. Am. Chem. Soc. 1994, 116, 7973.

Various publications, such as U.S. Pat. No. 6,849,679, U.S. Pat. No. 4,656,226, U.S. Pat. No. 4,755,563, U.S. Pat. No. 5,085,698, U.S. Pat. No. 5,160,372, U.S. Pat. No. 5,219,945, U.S. Pat. No. 5,221,334, U.S. Pat. No. 5,272,201, U.S. Pat. No. 5,519,085, U.S. Pat. No. 5,859,113, U.S. Pat. No. 6,306,994, U.S. Pat. No. 6,316,564, U.S. Pat. No. 6,413,306, WO 01/44389, WO 93/046029 and EP 1 416 019, describe the use of block copolymers and gradient copolymers, obtained using controlled polymerization processes, as wetting agents and dispersants.

In the text below, block copolymers and gradient copolymers are referred to as structured copolymers.

In spite of the use of such structured copolymers in comparison to random copolymers there continues to be an urgent need for better dispersants, specifically a need for improved compatibility between pigment concentrates produced using these wetting agents and dispersants, and various letdown binders.

Surprisingly it has been found that blends of two linear, structured copolymers characterized in that they are prepared by two different controlled polymerization techniques and possess different molecular weight distributions ($M_w/M_n$) combine effective stabilization of the pigment dispersion in pigment concentrates, inks or liquid coating materials, and corresponding viscosity reduction, with a broader compatibility with different binder systems than the wetting agents and dispersants of the prior art.

U.S. Pat. No. 6,455,628 describes the combination of block copolymers with random copolymers for improving the wetting of pigments and hence reducing the dispersing time when producing aqueous pigment concentrates. It does not, however, achieve broader compatibility of these pigment concentrates with different letdown systems.

Blends or compositions of the invention are those which comprise at least two structured linear copolymers selected from the group consisting of block copolymers and gradient copolymers, these copolymers being prepared by different controlled polymerization techniques, and the difference in the polydispersities of these copolymers, $\Delta(M_w/M_n)$, being ≥0.25.

These blends may comprise two copolymers which differ in their polymer structures, molecular weights and monomer compositions.

Structured copolymers of the blends of the invention are gradient copolymers and linear block copolymers.

Gradient copolymers of the blends of the invention are linear copolymers in which along the polymer chains, from their beginning to their end, the concentration of one ethylenically unsaturated monomer or one mixture of ethylenically unsaturated monomers decreases continuously and the concentration of another ethylenically unsaturated monomer or another mixture of ethylenically unsaturated monomers increases. Gradient copolymers of this kind are described for example in EP 1 416 019 and in WO 01/44389. In accordance with the invention it is also possible for both structured linear copolymers of the composition of the invention to be gradient copolymers.

Block copolymers of the polymer blends of the invention are linear copolymers which are obtained by adding at least two different ethylenically unsaturated monomers, two different mixtures of ethylenically unsaturated monomers or one ethylenically unsaturated monomer and one mixture of ethylenically unsaturated monomers at different times during the implementation of a controlled polymerization, it being possible for an ethylenically unsaturated monomer or a mixture of ethylenically unsaturated monomers to have been charged to the reaction vessel at the beginning of the reaction. In the case of the addition of the further ethylenically unsaturated monomer or of the mixture of ethylenically unsaturated monomers, or in the case of the addition of ethylenically unsaturated monomers in the case of two or more additions, the ethylenically unsaturated monomers which are present in the reaction vessel may have already undergone complete reaction or else may still be partly present. As a result of a preparation process of this kind, such block copolymers contain at least one sharp transition in their composition of ethylenically unsaturated monomers along the polymer chain, which represents the boundary between the individual blocks. Examples of such block copolymer structures are AB diblock copolymers, and ABA or ABC triblock copolymers, of the kind which can be used in the present invention. Examples of block copolymer structures of this kind are described in U.S.

Pat. No. 6,849,679, U.S. Pat. No. 4,656,226, U.S. Pat. No. 4,755,563, U.S. Pat. No. 5,085,698, U.S. Pat. No. 5,160,372, U.S. Pat. No. 5,219,945, U.S. Pat. No. 5,221,334, U.S. Pat. No. 5,272,201, U.S. Pat. No. 5,519,085, U.S. Pat. No. 5,859,113, U.S. Pat. No. 6,306,994, U.S. Pat. No. 6,316,564, U.S. Pat. No. 6,413,306, WO 01/44389, WO 93/046029. Block copolymers of the kind used in the present invention contain blocks having a minimum number of 3 copolymerized ethylenically unsaturated monomers per block. The minimum number of copolymerized ethylenically unsaturated monomers per block is preferably 3, more preferably 5, and very preferably 10. In one preferred embodiment both structured linear copolymers of the composition of the invention are block copolymers, and are preferably selected from the group consisting of AB, ABA and ABC block copolymers. It is also possible, however, for one of the two copolymers to be a gradient copolymer and the other a block copolymer. Where block copolymers are employed alone or with gradient copolymers, at least one block copolymer preferably possesses an AB structure.

Very particular preference is given to block copolymers in which at least one of the blocks is composed of at least two different copolymerized ethylenically unsaturated monomers. Preferably all of the blocks within the block copolymer each contain at least two different copolymerized ethylenically unsaturated monomers. With very particular preference the blocks each contain at least three, four or five different copolymerized monomers.

The individual polymers of the blend of the invention preferably possess a number-average molecular weight $M_n$ of 1000 to 20 000 g/mol, more preferably 2000 to 20 000 g/mol and very preferably 2000 to 15 000 g/mol.

Furthermore, the individual polymers in the copolymer blend of the invention are distinguished by a different molecular weight distribution $M_w/M_n$ which ranges preferably from 1.05 to 4.0. In this case the difference in the molecular weight distribution (polydispersity), $\Delta(M_w/M_n)$, between the individual copolymers is at least 0.25.

The structured copolymers of the polymer blends of the invention preferably contain polar ethylenically unsaturated monomers from the group of the amino-containing ethylenically unsaturated monomers and/or of the acid-functional ethylenically unsaturated monomers, and also the reaction products of the amino groups and/or acid groups to form salts.

Ethylenically unsaturated monomers containing amino groups include, for example, in a list in which the (meth) acrylate notation includes not only acrylates but also methacrylates, the following: aminoalkyl (meth)acrylates, such as N,N-dimethylaminoethyl (meth)-acrylate and N,N-dimethylaminopropyl (meth)acrylate, for example; aminoalkyl (meth)acrylamides, such as N,N-dimethylaminopropyl (meth)acrylamide, for example; or basic vinyl heterocycles, such as 4-vinylpyridine and vinylimidazole, for example.

Ethylenically unsaturated monomers containing amino groups can also be generated by polymer-analogous reactions after the synthesis of the polymer chain. Thus oxirane-containing ethylenically unsaturated monomers such as glycidyl methacrylate can be reacted with amines after the polymerization.

Reaction products of amino-containing, ethylenically unsaturated monomers to form salts can be obtained, for example, by salinating amino groups attached to the polymer, using carboxylic acids, sulphonic acids or phosphoric acids and their esters, as described for example in U.S. Pat. No. 6,111,054.

Furthermore, amino groups can be salinated in alkylating reactions, for example with benzyl chloride or with a combination of oxirane with carboxylic acids, to form quaternary ammonium groups. Tertiary amines can be converted using oxygen, peroxo compounds such as percarboxylic acids, and using hydrogen peroxide into amine oxides, which additionally can be salinated using acids such as hydrochloric acid, for example.

These reactions can be carried out as polymer-analogous reactions after the polymerization; alternatively, the reaction products of amino-containing ethylenically unsaturated monomers to give salts can be used directly in the polymerization.

Examples of reaction products of this kind which can be used directly as monomers in the polymerization are 2-trimethylammonioethyl (meth)acrylate chloride, 3-trimethylammoniopropyl(meth)acrylamide chloride and 2-benzyldimethylammonioethyl (meth)acrylate chloride.

Examples of acid-functional ethylenically unsaturated monomers include the following: ethylenically unsaturated monomers containing carboxylic acid groups, such as acrylic acid, methacrylic acid, maleic acid, fumaric acid, itaconic acid and 4-vinylbenzoic acid, for example; ethylenically unsaturated monomers containing sulphonic acid groups, such as 4-vinylbenzenesulphonic acid, 2-methyl-2-[(1-oxo-2-propenyl)amino]-1-propanesulphonic acid, 3-(meth-acryloyloxy)propanesulphonic acid and 3-(acryloyloxy)-propanesulphonic acid, for example; and acidic ethylenically unsaturated monomers containing phosphorus, such as tripropylene glycol (meth)acrylate phosphate, vinylphosphonic acid and vinylidene-diphosphonic acid, for example.

Ethylenically unsaturated monomers containing acid groups can also be generated by means of polymer-analogous reactions after the synthesis of the polymer chain.

Salts of acid-functional, ethylenically unsaturated monomers can be obtained, for example, by reaction with bases. Examples of suitable bases include amines such as, for example, dimethylaminoethanol, diethanolamine, triethanolamine, 2-(dimethylamino)propan-1-ol, triethylamine, butylamine and dibutylamine; hydroxides, oxides, carbonates and hydrogen carbonates of metals of main groups 1 to 3 of the Periodic Table of the Elements, such as, for example, sodium hydroxide, potassium hydroxide, aluminium hydroxide and sodium hydrogen carbonate, and heterocyclic nitrogen compounds such as, for example, imidazole.

Hydroxyl groups in the ethylenically unsaturated monomers can be reacted with, for example, polyphosphoric acid to give phosphoric esters. The same applies to oxirane structures in ethylenically unsaturated monomers and orthophosphoric acid.

Moreover, carboxylic acid functions can be formed from ester-containing, ethylenically unsaturated monomers. In this case the ester, such as an alkyl (meth)acrylate, for example, can be reacted with acid catalysis to give the carboxylic acid function, or, in the case of using bases, can be reacted by hydrolysis to form its corresponding salt.

It is also possible to produce acid functions in the polymer from acid anhydrides such as maleic anhydride, for example, by reaction with hydroxy-functional compounds such as water, monohydric alcohols or polyethers.

All of the aforementioned reactions can be carried out as polymer-analogous reactions after the polymerization. Alternatively the reaction products of acid-functional ethylenically unsaturated monomers to form salts can be used in the polymerization.

Examples of reaction products of this kind which are used directly as monomers in the polymerization have been specified above, but may also be, for example, sodium (meth) acrylate, sodium tripropylene glycol (meth)acrylate phosphate, potassium (3-sulphopropyl) (meth)acrylate, sodium 3-allyloxy-2-hydroxypropane-sulphonic acid, and dipotassium bis(3-sulphopropyl)-itaconate.

Further ethylenically unsaturated monomers which can be used to synthesize the structured copolymers include the following: alkyl (meth)acrylates of linear, branched or cycloaliphatic alcohols having 1 to 22 carbon atoms, such as, for example, methyl (meth)acrylate, ethyl (meth)acrylate, n-butyl (meth)acrylate, isobutyl (meth)acrylate, tert-butyl (meth)acrylate, lauryl (meth)acrylate, 2-ethylhexyl (meth)acrylate, stearyl (meth)acrylate, cyclohexyl (meth)acrylate and isobornyl (meth)acrylate; aryl (meth)acrylates, such as benzyl methacrylate or phenyl acrylate, it being possible for the aryl radicals in each case to be unsubstituted or to be substituted up to four times, such as, for example, 4-nitrophenyl methacrylate; hydroxyalkyl (meth)acrylates of linear, branched or cycloaliphatic diols having 2 to 36 carbon atoms, such as, for example, 3-hydroxypropyl meth-acrylate, 3,4-dihydroxybutyl monomethacrylate, 2-hydroxyethyl (meth)acrylate, 4-hydroxybutyl (meth)-acrylate, 2-hydroxypropyl methacrylate, 2,5-dimethyl-1,6-hexanediol monomethacrylate; mono(meth)acrylates of ethers, polyethylene glycols, polypropylene glycols or mixed polyethylene/propylene glycols having 5 to 80 carbon atoms, such as, for example, tetra-hydrofurfuryl (meth)acrylate, methoxyethoxyethyl (meth)acrylate, 1-butoxypropyl (meth)acrylate, cyclo-hexyloxymethyl (meth)acrylate, methoxymethoxyethyl (meth)acrylate, benzyloxymethyl (meth)acrylate, furfuryl (meth)acrylate, 2-butoxyethyl (meth)acrylate, 2-ethoxyethyl (meth)acrylate, allyloxymethyl (meth)-acrylate, 1-ethoxybutyl (meth)acrylate, 1-ethoxyethyl (meth)acrylate, ethoxymethyl (meth)acrylate, poly-(ethylene glycol) methyl ether (meth)acrylate, poly(propylene glycol) methyl ether (meth)acrylate; caprolactone- and/or valerolactone-modified hydroxy-alkyl (meth)acrylates having a number-average molecular weight, $M_n$, of 220 to 1200, the hydroxy (meth)acrylates preferably deriving from linear, branched or cycloaliphatic diols having 2 to 8 carbon atoms; (meth)acrylates of halogenated alcohols, such as, for example, perfluoroalkyl (meth)acrylates having 6 to 20 carbon atoms; oxirane-containing (meth)acrylates, such as, for example, 2,3-epoxybutyl methacrylate, 3,4-epoxybutyl methacrylate and glycidyl (meth)-acrylate; styrene and substituted styrenes, such as, for example, 4-methylstyrene; methacrylonitrile and acrylonitrile; non-basic vinyl heterocycles, such as, for example, 1-[2-(methacryloyloxy)ethyl]-2-imidazo-lidinone and N-vinylpyrrolidone; vinyl esters of carboxylic acids having 1 to 20 carbon atoms, such as, for example, vinyl acetate; maleimide, N-phenylmaleimide and N-substituted maleimides with linear, branched or cycloaliphatic alkyl groups having 1 to 22 carbon atoms, such as, for example, N-ethylmaleimide and N-octylmaleimide; (meth)acrylamide; N-alkyl- and N,N-dialkyl-substituted acrylamides with linear, branched or cycloaliphatic alkyl groups having 1 to 22 carbon atoms, such as, for example, N-(tert-butyl)acrylamide and N,N-dimethyl-acrylamide; and (meth)acrylates containing silyl groups, such as, for example, trimethylsilyl (meth)acrylate and 3-(trimethylsilyl)propyl methacrylate.

After polymerization has taken place, the ethylenically unsaturated monomers just specified can be altered subsequently as well in the polymers, in polymer-analogous reactions. Thus, for example, oxirane structures in the polymer can be converted using nucleophiles such as 4-nitrobenzoic acid. Hydroxyl functionalities of the ethylenically unsaturated monomers incorporated into the polymer can be converted to polyesters using lactones such as ϵ-caprolactone, for example. In the case of polymers containing vinyl ester monomers, alcohol functions may come about from these ester functions through acid- or base-catalysed ester cleavage.

The monofunctional initiators used to prepare the copolymers of the invention initiate a polymer chain with only one direction of propagation. The monofunctional initiators used in the respective living, controlled polymerization process are known to a person of ordinary skill in the art. Examples of initiators which can be used include azo initiators such as azodiisobutyronitrile, peroxide compounds, such as dibenzoyl peroxide and dicumyl peroxide, and persulphates, such as ammonium, sodium and potassium peroxodisulphate.

Depending on polymerization technique, different copolymers are obtained even when using identical ethylenically unsaturated monomers even in the same molar proportions, since the different polymerization techniques lead to different microstructures and/or sequences of the copolymerized ethylenically unsaturated monomers within copolymers. For example, in the case of the preparation of blocks in block copolymers using different techniques, blocks with different microstructures are obtained when identical monomer mixtures are used. In addition to the different microstructuring as a result of the preparation technique, the copolymers obtained may also differ significantly in molecular weight and molecular-weight distribution. The same is also true of gradient copolymers.

Polymerization techniques which can be used to prepare the copolymers for use in the compositions of the invention are all prior-art living controlled polymerization techniques, examples being RAFT, MADIX, NMP, ATRP, GTP, controlled free-radical polymerization with tetraphenylethane, controlled free-radical polymerization with 1,1-diphenylethene, controlled free-radical polymerization with iniferters, and controlled free-radical polymerization with organo-cobalt complexes.

Examples of polymerization regulators and initiators are listed in the literature cited above.

In the case of NMP, furthermore, it is possible to employ NMP adducts of the initiator with the polymerization regulator, as described in, for example, Chem. Rev. 2001, 101, 3661, "V. Approaches to Alkoxyamines" or in Angewandte Chemie Int. Ed. 2004, 43, 6186.

The polymerization may take place solventlessly, in bulk, or in organic solvents and/or water. Where solvents are used, the polymerization may be conducted as a conventional solution polymerization, with the polymer in solution in the solvent, or as an emulsion or miniemulsion polymerization, as described in, for example, Angewandte Chemie Int. Ed. 2004, 43, 6186 and Macromolecules 2004, 37, 4453. The emulsion polymer or miniemulsion polymer obtained can be made water-soluble by salination, so forming a homogeneous polymer solution. After the salination, however, the polymers may still be insoluble in water.

In this case the copolymers obtained are not automatically defined via the polymerization regulator as end group. After the polymerization, for example, the end group may be wholly or partly eliminated. Thus, for example, it is possible to carry out thermal elimination of the nitroxyl end group of the polymer prepared by NMP by raising the temperature beyond the polymerization temperature. This elimination of the polymerization regulator may also take place, for example, by addition of further chemical compounds such as polymerization inhibitors, phenol derivatives for example, or by means of a process as described in Macromolecules 2001, 34, 3856.

The RAFT regulator can be eliminated thermally by raising the temperature of the polymer, can be removed from the polymer by adding oxidizing agents such as hydrogen peroxide, peracids, ozone or other bleaches, or can be reacted with nucleophiles such as amines to form a thiol end group.

Furthermore, the halogen end groups generated by ATRP can be eliminated by elimination reactions or can be converted into other end groups by substitution reactions. Examples of such transformations are set out in Chem. Rev. 2001, 101, 2921.

The copolymers obtained in this way are converted to the polymer blend of the invention in a mixing operation, which may be assisted by heating of the polymer solutions. Where two copolymers are used, the weight ratio of the two copolymers to one another is preferably between 5:95 and 95:5, more preferably between 10:90 and 90:10 and very preferably between 20:80 and 80:20.

The compositions of the invention preferably contain not more than 10%, more preferably not more than 5% and very preferably not more than 1% by weight of one or more random copolymers or homopolymers formed by termination reactions during the polymerization. In the ideal scenario the compositions of the invention are free, or substantially free, from random copolymers and homopolymers.

The copolymer blends of the invention can be used in accordance with the prior art for known dispersants, using the dispersants according to the invention in place of their prior-art counterparts. Thus, for example, they can be used in the preparation or processing of paints, printing inks, inkjet inks, paper coatings, leather colours and textile colours, pastes, pigment concentrates, ceramics, cosmetic preparations, particularly if they contain solids such as pigments and/or fillers. They can also be employed in connection with the preparation or processing of casting and/or moulding compounds based on synthetic, semi-synthetic or natural macromolecular compounds, such as polyvinyl chloride, saturated or unsaturated polyesters, polyurethanes, polystyrenes, polyacrylates, polyamides, epoxy resins, polyolefins such as polyethylene or polypropylene, for example. By way of example it is possible to use the copolymer blends for preparing casting compounds, PVC plastisols, gelcoats, polymer concrete, printed circuit boards, industrial paints, wood and furniture varnishes, vehicle finishes, marine paints, anti-corrosion paints, can coatings and coil coatings, decorating paints and architectural paints, where binders and/or solvents, pigments and optionally fillers, the copolymer blends, and typical auxiliaries are mixed. Examples of typical binders are resins based on polyurethanes, cellulose nitrates, cellulose acetobutyrates, alkyds, melamines, polyesters, chlorinated rubbers, epoxides and (meth)acrylates. Examples of water-based coatings are cathodic or anodic electrodeposition coatings for car bodies, for example. Further examples are renders, silicate paints, emulsion paints, aqueous paints based on water-thinnable alkyds, alkyd emulsions, hybrid systems, 2-component systems, polyurethane dispersions and acrylate dispersions.

The copolymer blends of the invention are particularly suitable as well for preparing concentrates of solids, such as pigment concentrates, for example. For that purpose the copolymer blends of the invention are initially introduced in a carrier medium such as organic solvents, plasticizers and/or water, and the solids to be dispersed are added with stirring. Additionally these concentrates may include binders and/or other auxiliaries. With the copolymer blends of the invention, however, it is possible in particular to prepare stable, binder-free pigment concentrates.

It is also possible, using the compounds of the invention, to prepare fluid concentrates of solids from pigment presscakes. In this case the copolymer blend of the invention is admixed to the presscake, which may additionally contain organic solvents, plasticizers and/or water, and the resulting mixture is dispersed. Prepared in their different ways, the concentrates of solids can then be incorporated into different substrates such as, for example, alkyd resins, polyester resins, acrylate resins, polyurethane resins or epoxy resins. Pigments can also, however, be dispersed directly in the copolymer blends of the invention, without solvent, and are then particularly suitable for pigmenting thermoplastic and thermoset polymer formulations.

The copolymer blends of the invention can also be used with advantage in connection with the production of colour filters for liquid-crystal displays, liquid-crystal screens, colour resolution devices, sensors, plasma screens, displays based on SED (Surface conduction Electron emitter Display) and for MLCC (Multi-Layer Ceramic Compounds). The MLCC technology is used in connection with the production of microchips and printed circuit boards.

The copolymer blends of the invention can also be used to produce cosmetic preparations such as, for example, makeup, powder, lipsticks, hair colorants, creams, nail varnishes and sun protection products. These may be present in the customary forms, such as, for example, as W/O or O/W emulsions, solutions, gels, creams, lotions or sprays. The copolymer blends of the invention can be used with advantage in dispersions that are used for producing these preparations. These dispersions may contain the carrier media that are typical for these purposes in cosmetology, such as, for example, water, castor oils or silicone fluids, and solids, such as organic and inorganic pigments such as titanium dioxide or iron oxide, for example.

The invention also provides for the use of a dispersant of this kind for producing a pigmented coating on a substrate, the pigmented paint being applied to the substrate, and the pigmented paint which has been applied to the substrate being baked or cured and/or crosslinked.

The copolymer blends can be used alone or together with customary prior-art binders. For use in polyolefins, for example, it can be advantageous to use corresponding polyolefins of low molecular mass as carrier materials, together with the copolymer blend.

One inventive use of the copolymer blends is also in the preparation of dispersible solids in powder particle and/or fibre particle form, more particularly of dispersible pigments or plastics fillers, the particles being coated with the copolymer blend. Coatings of this kind on organic and inorganic solids are produced in a known way, as described for example in EP-A-0 270 126. Here, the solvent or emulsion medium can either be removed or remain in the mixture, forming pastes. These pastes are typical commercial products and may further include binder fractions and also additional auxiliaries and additives. Specifically in the case of pigments it is possible for the pigment surface to be coated during or after the synthesis of the pigments, by the addition, for example, of the copolymer blends of the invention to the pigment suspension, or during or after the pigment finish. The pigments pretreated in this way are distinguished by greater ease of incorporation and also by improved viscosity, flocculation and gloss behaviour and by higher colour strength as compared with untreated pigments.

Examples of suitable pigments are mono-, di-, tri- and poly-azo pigments, oxazine, dioxazine and thiazine pigments, diketopyrrolopyrroles, phthalocyanines, ultramarine and other metal complex pigments, indigoid pigments, diphenylmethane, triarylmethane, xanthene, acridine, quinacridone and methine pigments, anthraquinone, pyranthrone, perylene and other polycyclic carbonyl pigments. Further examples of organic pigments are found in the monograph by W. Herbst and K. Hunger, "Industrial Organic Pigments", 1997 (Publisher: Wiley-VCH, ISBN: 3-527-28836-8). Examples of inorganic pigments are pigments based on carbon black, graphite, zinc, titanium dioxide, zinc oxide, zinc sulphide, zinc phosphate, barium sulphate, lithopones, iron oxide, ultramarine, manganese phosphate, cobalt aluminate, cobalt stannate, cobalt zincate, antimony oxide, antimony sulphide, chromium oxide, zinc chromate, mixed metal oxides based on nickel, bismuth, vanadium, molybdenum, cadmium, titanium, zinc, manganese, cobalt, iron, chromium, antimony, magnesium and aluminium (examples being nickel titanium yellow, bismuth vanadate molybdate yellow or chromium titanium yellow), magnetic pigments based on pure iron, iron oxides and chromium oxides or mixed oxides, metallic pigments comprising aluminium, zinc, copper or brass, and also pearlescent pigments, and fluorescent and phosphorescent luminescent pigments.

Further examples are nanoscale organic or inorganic solids having particle sizes below 100 nm, such as certain grades of carbon black, or particles composed of a metal or semimetal oxide or hydroxide, and also particles composed of mixed metal and/or semimetal oxides and/or hydroxides. By way of example it is possible to employ the oxides and/or oxide hydroxides of aluminium, of silicon, of zinc, of titanium, and the like in order to prepare extremely finely divided solids of this kind. The operation of producing these oxidic or hydroxidic or oxide-hydroxidic particles may take place via any of a very wide variety of methods, such as, for example, ion exchange operations, plasma operations, sol-gel processes, precipitation, comminution (by grinding, for example) or flame hydrolysis and the like.

Examples of pulverous or fibrous fillers are, for example, those composed of pulverous or fibrous particles of aluminium oxide, aluminium hydroxide, silicon dioxide, kieselguhr, siliceous earth, quartz, silica gel, talc, kaolin, mica, perlite, feldspar, slate flour, calcium sulphate, barium sulphate, calcium carbonate, calcite, dolomite, glass or carbon. Further examples of pigments or fillers are found in EP-A-0 270 126, for example. Additionally flame retardants such as, for example, aluminium hydroxide or magnesium hydroxide, and matting agents such as silicas, for example, can likewise be dispersed and stabilized outstandingly.

The choice of groups with pigment affinity and of the ethylenically unsaturated monomers is guided by the pigment to be dispersed and also by the liquid medium and the binder, and may differ from one case to another. For example, the monomers may be chosen such that they interact with the material to be dispersed. For instance, acid groups are frequently used as pigment affinity groups for basic pigment surfaces, and basic groups for acidic pigment surfaces or organic pigments. For wetting agents and dispersants for aqueous pigmented systems it is very common to make the wetting agent and dispersant soluble in water by way of the salt of an acidic group.

Further provided by the present invention are coating materials, pastes and moulding compounds comprising the copolymer blends of the invention and one or more pigments, organic solvents and/or water, and also, where appropriate, binders and typical coatings auxiliaries. The invention further provides pigments coated with the copolymer blends of the invention.

EXAMPLES

Preparation of the Polymers and of the Inventive Polymer Blends

Polymer 1 (Comparative Example, Random Copolymer A Prepared by Free-Radical Polymerization)

41.29 g of 1-methoxy-2-propyl acetate are heated to 135° C. in a reaction vessel under an inert gas atmosphere (nitrogen). Then a mixture of 7.8 g of 2-hydroxyethyl methacrylate, 7.85 g of 2-(N,N-dimethyl-amino)ethyl methacrylate, 9.76 g of styrene, 21.4 g of n-butyl acrylate, 1.58 g of 2-ethylhexyl acrylate and 0.5 g of tert-butyl peroxybenzoate is metered in over a period of 4 h. The after reaction time is 1 hour. Thereafter a mixture of 8.78 g of 1-methoxy-2-propyl acetate and 0.2 g of tert-butyl peroxybenzoate is metered in over a period of 60 min. The after reaction time is 2 h.

$M_n$=11 450 g/mol
$M_w/M_n$=2.21

Formation of Ionic Groups:

80 g of the polymer solution are reacted with 4.88 g of benzoic acid and 8.72 g of tert-butylphenyl glycidyl ether at 120° C. for 2 h. The polymer solution is adjusted with 1-methoxy-2-propyl acetate to a solids of 50%.

Polymer 2 (Diblock Copolymer A Prepared by NMP)

206 g of 1-methoxy-2-propyl acetate, 9.6 g of BlocBuilder, 16 g of 2-hydroxyethyl methacrylate, 58.4 g of n-butyl acrylate, 56.2 g of 2-(N,N-dimethyl-amino)ethyl methacrylate and 36.8 g of styrene are heated to 115° C. in a reaction vessel under an inert gas atmosphere. The reaction time is 5 hours; a conversion of 90% (measured by $^1$H NMR) was achieved. Then a mixture of 48 g of 2-hydroxyethyl methacrylate, 8.0 g of 2-(N,N-dimethylamino)ethyl methacrylate, 43 g of styrene, 12.9 g of 2-ethylhexyl acrylate, 116.46 g of n-butyl acrylate and 1.4 g of 2,2'-azobis(2-methyl-butyronitrile) is metered in over a period of 60 min. The reaction time is 5 hours; a conversion of 92% (measured by $^1$H NMR) was achieved. A mixture of 71.8 g of 1-methoxy-2-propyl acetate and 1.6 g of 2,2'-azobis(2-methylbutyronitrile) is metered in over a period of 60 min. The after reaction time is 120 minutes. The polymer solution is adjusted with 1-methoxy-2-propyl acetate to a solids of 50%.

$M_n$=6220 g/mol
$M_w/M_n$=3.5

Formation of Ionic Groups:

200 g of the polymer solution are reacted with 9.9 g of benzoic acid and 17.7 g of tert-butylphenyl glycidyl ether at 120° C. for 2 h. 5.8 g of ricinol fatty acid are added to the polymer solution, which is then adjusted with 1-methoxy-2-propyl acetate to a solids of 50%.

Polymer 3 (Diblock Copolymer A Prepared by RAFT)

284.8 g of 1-methoxy-2-propyl acetate and 20.1 g of MMA dimer are heated to 120° C. in a reaction vessel under an inert gas atmosphere. Then a mixture of 25.3 g of 2-hydroxyethyl methacrylate, 89.0 g of 2-(N,N-dimethyl-amino)ethyl methacrylate, 58.3 g of styrene, 92.5 g of n-butyl methacrylate and 1.4 g of 2,2'-azo-bis(2-methylbutyronitrile) is metered in over a period of 180 min. The reaction time is 30 minutes. A mixture of 12.6 g of 2-(N,N-dimethylamino)ethyl methacrylate, 68.1 g of styrene, 20.4 g of 2-ethylhexyl methacrylate, 184.5 g of n-butyl methacrylate, 76.0 g of 2-hydroxy-ethyl methacrylate and 4.75 g of 2,2'-azobis(2-methyl-butyronitrile) is metered in over a period of 90 min. The reaction time is 30 minutes. Over a period of 60 minutes, 2.39 g of 2,2'-azobis(2-methylbutyronitrile) are added. The reaction time is 120 minutes.

$M_n$=4400 g/mol
$M_w/M_n$=2.6

Formation of Ionic Groups:

150 g of the polymer solution are reacted with 12.5 g of benzoic acid and 22.3 g of tert-butylphenyl glycidyl ether at 120° C. for 2 h. The polymer solution is adjusted with 1-methoxy-2-propyl acetate to a solids of 50%.

Polymer 4 (Diblock Copolymer B Prepared by GTP)

All of the ingredients used are purified by means of flash chromatography over basic Alox. The reaction apparatus is water-free and under inert gas. 115 g of tetrahydrofuran are charged together with 6 g of 1-methoxy-2-methyl-1-trimethylsiloxypropene to a three-necked flask. 0.6 g of tetrabutylammonium m-chloro-benzoate, 48% in acetonitrile, is added, and immediately thereafter, slowly, a mixture of 28 g of methyl methacrylate, 14 g of n-butyl methacrylate, 14 g of 2-ethylhexyl methacrylate, 7 g of benzyl methacrylate and 7 g of ethyl triglycol methacrylate is added dropwise at a rate such that the reaction temperature does not exceed 50° C. When the entire mixture has been added dropwise, 70 g of 2-(dimethyl-amino)ethyl methacrylate are added dropwise at 50° C. The after reaction time is 1 hour. Then 6 ml of ethanol are added and the reaction is at an end. Subsequently the THF is replaced by 1-methoxy-2-propyl acetate and the polymer solution is adjusted to a solids of 60%.

$M_n$=7430 g/mol $M_w/M_n$=1.34

Formation of Ionic Groups:

153.15 g of the polymer solution are reacted with 24.6 g of benzoic acid and 44.0 g of tert-butylphenyl glycidyl ether at 120° C. for 2 h. The polymer solution is adjusted with 1-methoxy-2-propyl acetate to a solids of 50%.

Polymer 5 (ABC Triblock Copolymer)

17.9 g of 2-methoxypropanol, 4.8 g of BlocBuilder, 14.6 g of n-butyl acrylate, 4 g of 2-hydroxyethyl methacrylate, 9.2 g of styrene, 2 g of 2-(N,N-dimethyl-amino)ethyl methacrylate and 30 g of Madquat Bz 75 are heated to 120° C. in a reaction vessel under an inert gas atmosphere (nitrogen). When a degree of conversion of 95% (measured by $^1$H NMR) has been reached, a monomer mixture of 14.6 g of n-butyl acrylate, 4 g of 2-hydroxyethyl methacrylate, 9.2 g of styrene, 2 g of 2-(N,N-dimethylamino)ethyl methacrylate, 10.1 g of Madquat Bz 75 and 30 g of 2-methoxypropanol is added. Following a conversion of 95%, 64.7 g of n-butyl acrylate, 24 g of 2-hydroxyethyl methacrylate, 21.5 g of styrene, 2 g of 2-(N,N-dimethylamino)ethyl meth-acrylate and 2.8 g of Madquat Bz 75 were added. Following a conversion of 97% (measured by $^1$H NMR), the polymer solution is cooled to room temperature and adjusted with 2-methoxypropanol to a solids of 50%.

$M_n$=9870 g/mol $M_w/M_n$=1.87

BlocBuilder: NMP adduct, manufacturer: Arkema

MMA dimer: Dimethyl 2,2-dimethyl-4-methylene-pentanedioate

For preparation see G. Moad, C. L. Moad, E. Rizzardo, S. H. Thang, Macromolecules 1996, 29, 7717-26

Madquat Bz 75: 2-Benzyldimethylammonioethyl meth-acrylate chloride, 75% in water, manufacturer: Arkema Composition of the Copolymer Blends Polymer Blend M1 (Comparative Example to M2, Blend with Random Copolymer 1):

Blend of polymers 1 and 2 in a ratio of 50% by weight polymer 1 to 50% by weight polymer 2.

Polymer Blend M2:

Blend of polymers 2 and 3 in a ratio of 50% by weight polymer 2 to 50% by weight polymer 3.

Polymer Blend M3:

Blend of polymers 2 and 4 in a ratio of 50% by weight polymer 2 to 50% by weight polymer 4.

Polymer Blend M4 (Comparative Example to M3, Blend with Random Copolymer 1):

Blend of polymers 1 and 4 in a ratio of 50% by weight polymer 1 to 50% by weight polymer 4.

Polymer Blend M5:

Blend of polymers 4 and 5 in a ratio of 50% by weight polymer 4 to 50% by weight polymer 5.

Performance Tests

Iron Oxide Pigment Concentrate

| | |
|---|---|
| 2-Methoxypropyl acetate | 26.9 |
| Starsol | 3.0 |
| Wetting agent and dispersant | 9.6 |
| Bayferrox 130 M | 60.0 |
| Aerosil R 972 | 0.5 |
| | 100.0 |

Heliogenblau Blue Pigment Concentrate

| | |
|---|---|
| 2-Methoxypropyl acetate | 56.3 |
| Starsol | 6.1 |
| Wetting agent and dispersant | 13.8 |
| Heliogenblau 7080 | 23.0 |
| BYK-Synergist 2100 | 0.8 |
| | 100.0 |

Dispersing: 40 min at 40° C. and 8000 rpm, Dispermat CV

Epikote Varnish:

| | |
|---|---|
| Epikote 1001 (75% in xylene) | 60.0 |
| Xylene | 17.0 |
| 2-Methoxypropanol | 12.8 |
| n-Butanol | 10.0 |
| BYK-325 | 0.2 |
| | 100.0 |

Curative:

| | |
|---|---|
| Versamid 115/70 | 71.0 |
| Xylene | 12.0 |
| 2-Methoxypropanol | 8.0 |
| n-Butanol | 9.0 |
| | 100.0 |

Letdown and Curing of the Paint:

| | |
|---|---|
| Pigment concentrate | 2.6 |
| Varnish | 18.3 |
| Curative | 9.1 |
| | 30.0 |

Synthalat Varnish:

| | |
|---|---|
| Synthalat F 477/55% in TB/X | 83.0 |
| Shellsol A | 13.5 |
| BorchNox M2 | 0.4 |
| Octa Soligen 173 | 2.6 |
| BYK-335 | 0.2 |
| BYK-066 N | 0.3 |
| | 100.0 |

Letdown and Curing of the Paint:

| | |
|---|---|
| Pigment concentrate | 2.6 |
| Varnish | 17.4 |
| | 20.0 |

The pigment concentrate is shaken with the varnish for 5 min. In the case of the Epikote varnish, the mixture is homogenized once again following addition of the curative.

Following application, a rub-out test is conducted.

The paint film is dried at room temperature.

Measurement of the ΔE Value Using Colour-Guide Sphere d/8° Spin from Byk Gardner.

| | |
|---|---|
| Starsol | Mixture of diesters, manufacturer: Haltermann |
| Bayferrox 130 M | Iron oxide pigment, manufacturer: Lanxess |
| Aerosil R 972 | Hydrophobic fumed silica, manufacturer: Degussa |
| Epikote 1001 | Reaction product of bisphenol A with epichlorohydrin, manufacturer: Shell |
| BYK-325 | Modified polysiloxane, manufacturer: Byk Chemie |
| Versamid 115/70 | Amine-containing polyamide, manufacturer: Cognis |
| Synthalat F 477 | Alkyd resin with unsaturated fatty acids, manufacturer: Synthopol |
| Shellsol A | Hydrocarbon, manufacturer: Shell |
| BorchNox M2 | Ketoxim, manufacturer: Borchers |
| Octa Soligen 173 | Ba and Co salts of fatty acids, manufacturer: Borchers |
| BYK-335 | Modified polysiloxane, manufacturer: Byk Chemie |
| BYK-066 N | Modified polysiloxane, manufacturer: Byk Chemie |

Assessment of Pigment Concentrates:

| | Bayferrox | | | | | | | |
|---|---|---|---|---|---|---|---|---|
| | Polymer | | | | Polymer blend | | | |
| | 1 | 2 | 3 | 4 | M1 | M2 | M3 | M4 |
| Viscosity | 1 | 1 | 1 | 1 | 1 | 1 | 1 | 1 |

| | Heliogenblau | | | | | | | |
|---|---|---|---|---|---|---|---|---|
| | Polymer | | | | Polymer blend | | | |
| | 1 | 2 | 3 | 4 | M1 | M2 | M3 | M4 |
| Viscosity | 3 | 2 | 2 | 1 | 3 | 2 | 1 | 1 |

Assessment of the Paint Films after 24 h:

| | Bayferrox letdown in Epikote 1001 | | | | | | | |
|---|---|---|---|---|---|---|---|---|
| | Polymer | | | | Polymer blend | | | |
| | 1 | 2 | 3 | 4 | M1 | M2 | M3 | M4 |
| ΔE | 2.76 | 0.7 | 6.58 | 5.54 | 1.64 | 1.54 | 1.29 | 3.42 |
| Visual assessment of paint surface | 3 | 1 | 3 | 3 | 2 | 1 | 1 | 2 |

| | Heliogenblau letdown in Epikote 1001 | | | | | | | |
|---|---|---|---|---|---|---|---|---|
| | Polymer | | | | Polymer blend | | | |
| | 1 | 2 | 3 | 4 | M1 | M2 | M3 | M4 |
| Flocculation | 3 | 2 | 1 | 1 | 2 | 2 | 2 | 2 |
| Visual assessment of paint surface | 3 | 2 | 1 | 1 | 3 | 2 | 1 | 1 |

| | Bayferrox letdown in Synthalat F 477 | | | | | | | |
|---|---|---|---|---|---|---|---|---|
| | Polymer | | | | Polymer blend | | | |
| | 1 | 2 | 3 | 4 | M1 | M2 | M3 | M4 |
| ΔE | 0.3 | 0.2 | 0.2 | 0.3 | 0.2 | 0.2 | 0.3 | 0.3 |
| Visual assessment of paint surface | 2 | 2 | 2 | 2 | 2 | 2 | 2 | 2 |

| | Heliogenblau letdown in Synthalat F 477 | | | | | | | |
|---|---|---|---|---|---|---|---|---|
| | Polymer | | | | Polymer blend | | | |
| | 1 | 2 | 3 | 4 | M1 | M2 | M3 | M4 |
| Flocculation | 3 | 3 | 2 | 3 | 3 | 2 | 1 | 3 |
| Visual assessment of paint surface | 3 | 3 | 2 | 3 | 2 | 1 | 2 | 3 |

Assessment of Pigment Concentrates:

| | Bayferrox | | |
|---|---|---|---|
| | Polymer | | Polymer blend |
| | 4 | 5 | M5 |
| Viscosity | 1 | 2 | 1 |

| | Heliogenblau | | |
|---|---|---|---|
| | Polymer | | Polymer blend |
| | 4 | 5 | M5 |
| Viscosity | 1 | 3 | 1 |

Assessment of Paint Films after 24 h:

| | Bayferrox letdown in Epikote 1001 | | |
|---|---|---|---|
| | Polymer | | Polymer blend |
| | 4 | 5 | M5 |
| ΔE | 5.54 | 0.98 | 1.5 |
| Visual assessment of paint surface | 3 | 3 | 2 |

Heliogenblau letdown in Epikote 1001

| | Polymer | | Polymer blend |
|---|---|---|---|
| | 4 | 5 | M5 |
| Flocculation | 1 | 2 | 2 |
| Visual assessment of paint surface | 1 | 2 | 2 |

Bayferrox letdown in Synthalat F 477

| | Polymer | | Polymer blend |
|---|---|---|---|
| | 4 | 5 | M5 |
| ΔE | 0.3 | 5.7 | 1.3 |
| Visual assessment of paint surface | 2 | 3 | 2 |

Heliogenblau letdown in Synthalat F 477

| | Polymer | | Polymer blend |
|---|---|---|---|
| | 4 | 5 | M5 |
| Flocculation | 3 | 3 | 2 |
| Visual assessment of paint surface | 3 | 3 | 2 |

The assessment criteria for the letdowns were specified as follows:
Viscosity Assessment:
1: Highly mobile
2: Highly mobile with yield point
3: Highly viscous
Flocculation Assessment:
1: No flocs in the letdown
2: Few flocs in the letdown
3: Numerous flocs in the letdown
Visual Assessment of Paint Surface:
1: Defect-free paint surface with good levelling
2: Isolated specks and/or slight levelling defects
3: Many specks and/or poor levelling, characterized by a wavy paint surface A poor letdown is characterized by evaluation level 3 for the flocculation tendency, the visual assessment and/or a ΔE of greater than 2 in the rub-out.

In the letdowns and pigment concentrates with the two pigments Bayferrox and Heliogenblau, the use of polymers 1-5 for each polymer leads in one case at least to deleterious properties such as high viscosity of the pigment concentrate or deficient quality of the letdown, such as specks or flocs.

For the use of diblock and triblock copolymers, the polymer blends M2, M3 and M5 of the invention exhibit good letdown results in both selected binder systems and for both pigments, as compared with the prior art (the individual polymers and the polymer blends M1 and M4). These results show the broader usefulness of the polymer blends of the invention.

The invention claimed is:

1. A composition comprising two structured linear copolymers selected from the group consisting of block copolymers, wherein:
the copolymers are prepared by different controlled polymerization techniques and the difference in the polydispersities of the copolymers, $\Delta(M_w/M_n)$, is ≥0.25;
one or more of the block copolymers being AB, ABA or ABC block copolymers; and
at least one of the blocks of the block copolymer being composed of at least two different copolymerized ethylenically unsaturated monomers.

2. Composition according to claim 1, one block copolymer being an AB block copolymer and the other block copolymer being an AB, ABA or ABC block copolymer.

3. Composition according to claim 1, all blocks within a block copolymer being composed of in each case at least two different copolymerized ethylenically unsaturated monomers.

4. Composition according to claim 1, the two structured linear copolymers being present in a weight ratio of 5:95 to 95:5 to one another.

5. Composition according to claim 1, the polydispersity of the copolymers possessing in each case a value from 1.05 to 4.

6. Composition according to claim 1, the number-average molar mass of the copolymers being in each case from 1000 to 20 000 g/mol.

7. Composition according to claim 1, the controlled polymerization techniques being selected from the group consisting of RAFT, NMP, ATRP, GTP, controlled free-radical polymerization with tetraphenylethane, controlled free-radical polymerization with 1,1-diphenylethene, controlled free-radical polymerization with iniferters, and controlled free-radical polymerization with organocobalt complexes.

8. Composition according to claim 1, being a wetting agent and dispersant.

9. Composition according to claim 8, containing not more than 10% by weight of one or more random copolymers or homopolymers.

10. Composition according to claim 9, being substantially free from random copolymers and homopolymers.

11. Process for producing the compositions according to claim 1, the copolymers being blended in solution, with heating where appropriate.

12. Paints, inks, paper coatings, colours for leather or for textiles, pastes, pigment concentrates, ceramics, cosmetic preparations, casting or moulding compounds, colour filters for liquid-crystal displays, liquid-crystal screens, colour resolution devices, sensors, plasma screens, SED-based displays, and for MLCC; comprising the composition of claim 1.

13. Pigments or fillers coated with the wetting agent and/or dispersant composition of claim 8.

14. The pigments or fillers of claim 13, said pigments or fillers possessing a particle size below 100 nm.

15. Paints, pastes, casting compounds or moulding compounds comprising a composition according to claim 1.

16. Pigments or fillers coated with a composition obtained by the process according to claim 11.

17. The composition of claim 1, wherein the $\Delta(M_w/M_n)$ is from about 0.5 to about 1.3.

18. The composition of claim 1, wherein the $\Delta(M_w/M_n)$ is from about 0.25 to about 1.30.

19. The composition of claim 1, wherein the $\Delta(M_w/M_n)$ is from about 0.25 to about 3.

* * * * *